Feb. 26, 1963   R. DURRER ETAL   3,079,247
PROCESS FOR THE MANUFACTURE OF STEEL
Filed Aug. 13, 1958

Inventors:
Robert Durrer, Günther Heintze, Hans Jenny
by Mestern and Kollin, Attorneys.

3,079,247
PROCESS FOR THE MANUFACTURE OF STEEL
Robert Durrer, Günther Heintze, and Hans Jenny, Gerlafingen, Switzerland, assignors to Gesellschaft der Ludw. von Roll'schen Eisenwerke A.G., Gerlafingen, Switzerland
Filed Aug. 13, 1958, Ser. No. 754,849
Claims priority, application Germany Aug. 20, 1957
4 Claims. (Cl. 75—12)

In one process for the manufacture of steel, in which liquid pig iron is decarburised by iron ore or other iron oxide in an open hearth furnace, iron is recovered from the iron ore during the process. Since the reduction of the iron ore requires a considerable amount of heat to be supplied, the heating of the furnace must be so arranged that heat is transferred as rapidly and as completely as possible to the slag and to the metal. This requirement is difficult to fulfill in furnaces with a large capacity.

The invention aims at solving the problem of combining processes for the manufacture of steel from pig iron and for the recovery of iron from the reduced iron ore or other iron oxide.

According to the present invention, a furnace is charged with a charge containing at least 20% by weight of liquid pig iron covered by a solid layer of steel scrap in which iron ore or other iron oxide and slag-forming additions are embedded in one or more localised regions, after which the charge is heated from above to form one or more liquid craters extending through the solid layer to the surface of the pig iron in the region or regions in which the iron oxide and slag-forming additions are embedded, after which heating is continued to increase the extent of the craters until the charge is completely liquefied and the liquid charge is further treated to produce steel. Preferably an electric arc furnace is used and a crater is formed below the electrode of the furnace or below each electrode if there are more than one. Consequently the iron oxide and slag-forming addition are embedded in the scrap in the region or regions below the electrode or electrodes.

When working up such a charge, the following behaviour of arc furnaces is made use of:

The arcs from the electrodes rapidly melt the scrap lying in their immediate vicinity. They tend therefore to establish contact with the liquid pig iron present in the hearth of the furnace very quickly. In this way, the craters are formed very easily in the solid charge, and these craters are closed off at the bottom by the surface of the liquid pig iron. The more easily the steel scrap melts, the more rapidly will the craters be formed. Until the steel scrap is completely molten, these craters form melting vessels in which the heat produced by the arcs is concentrated.

The quantity of ore which is embedded in the solid part of the charge may be greater than that which is sufficient to react with the quantity of carbon which is in the pig iron and which is used for the reduction of the ores. The additional amount of carbon then necessary to reduce the ore is then embedded in the above described manner in the solid charge together with the ore and the slag-forming additions. The carbon may for example be in the form of disintegrated coal or coke. Other reducing agents may alternatively be used, for example ferrosilicon or aluminium or a mixture of these substances.

Instead of embedding the total quantity of the iron ores and other additions in the steel scrap when charging the furnace, as described above, only a part of the ores and additions may at first be embedded. The remainder is then added later on into the craters as melting of the charge proceeds.

The process of the invention is particularly advantageous because the reduction of the iron ores takes place in confined spaces which in effect form melting pots. In these pots, the heat produced by the arcs is concentrated in a relatively small space. Since the bottom of these pots is in direct communication with the liquid pig iron which must be refined, the refining of the pig iron and the reduction of the iron ores takes place much more rapidly than is usual and with much less expenditure of heat. The craters widen only gradually because heat flows away to the pig iron.

An example of a process in accordance with the invention is described with reference to the accompanying drawings in which.

Figure 1:
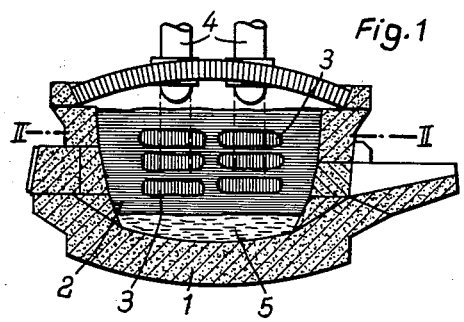
FIGURE 1 is a diagrammatic vertical section through an electric arc furnace and its charge before beginning to melt the charge.
Figure 2:
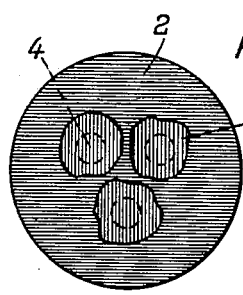
FIGURE 2 is a sectional plan of the inside only of the furnace through the inner chamber of the furnace and the charge, on the line II—II of FIGURE 1.

The furnace 1 is first charged with the solid charge which consists of scrap steel castings, forgings, and sheet metal 2 and iron ore and slag-forming additions 3, for example chalk and fluor spar. During charging, the iron ore and additions 3 are embedded in the steel scrap in positions where they lie in the regions in which craters 6 are later formed by the arcs from electrodes 4. After the furnace has been charged in this manner with the solid charge, liquid pig iron 5 is run into the furnace.

Figure 3:
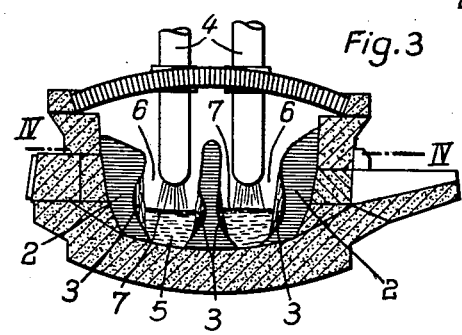
FIGURE 3 is a section similar to FIGURE 1 through the furnace and its contents after craters have been formed in the solid charge.
Figure 6:
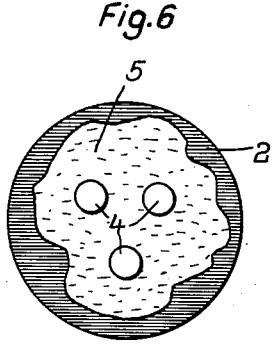
FIGURE 6 is a sectional plan through the contents of the furnace on the line V—V of FIGURE 5.
Figure 4:
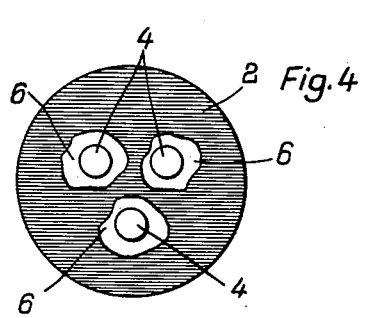
FIGURE 4 is a sectional plan through the contents of the furnace on the line IV—IV of FIGURE 3.

FIGURE 3 shows the nature of the furnace contents after melting has begun. The arcs proceeding from the electrodes 4 have melted craters in the scrap 2 which extend towards the pig iron 5. During the process, the ore and additions in the region of the arcs are melted to a slag containing a high proportion of iron, and this slag collects on the surface of the pig iron. The iron oxides present in the slag 7 are here reduced to iron by the carbon in the pig iron. This process takes place very rapidly because the heat produced by the arcs is concentrated in the craters 6 which are bounded on all sides.

Figure 5:
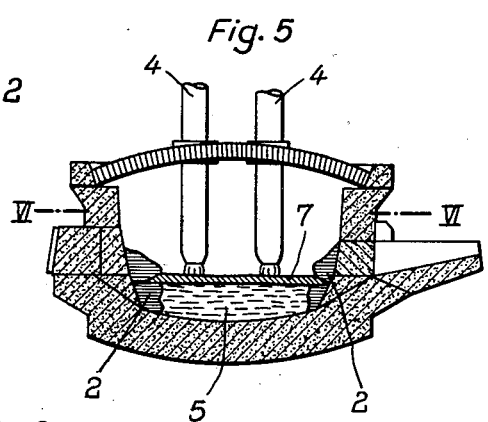
FIGURE 5 is a vertical section through the furnace and its contents at a later stage of the process.

FIGURE 5 shows the state of the charge in the furnace later in the process shortly before the residue of the scrap 2 melts. After the last scrap has melted, the molten iron 5 is finished in the usual manner to produce whatever type of steel is required.

The following is a quantitative example of the process according to the invention:

*(1) Type of Furnaces*

12-t3-phase arc furnace.
Transformer rating: 3,500 kva.
Graphite electrodes: 350 millimetres diameter.
Basic lining, silica cover.

*(2) Charge and Yield*

Scrap _____kg__ 5,300.
Liquid pig iron_____kg__ 3,620.

(I) Total metallic charge___kg__ 8,920=100%
    Ore (66 to 68% Fe)___kg__ 4,500
    Iron content of the ore__kg__ ~3,000~=33% of the original metal charge.

(II) Total metal content of the charge (scrap +pig iron+iron from ore) _____ kg__ 11,920
(III) Yield in raw steel _____ kg__ 11,180
Yield in percent:
(a) Calculated on the original metallic content of the charge (I=pig iron+scrap) percent__ 125.5
(b) Calculated on the total metal content of the charge (II=pig iron+scrap+iron from ore) _____ percent__ 93.8

(3) Duration of Process

Time from the beginning of the supply of energy up to the melting of the scrap (molten charge 0.48% C., temp. about 1550° C.) _____ 3 h. 05'
Iron content of the slag, percent _____ 10.2
Time from the beginning of supply of energy up to tapping (steel 0.13% C., tapping temp. 1670° C.) _____ 4 h. 25'

(4) Energy Consumption

Switching on until melting _____ kw. h__ 8,500
Switching on until tapping _____ kw. h__ 10,500

In the process according to the invention, the direct production of iron from ores and iron oxides is combined in a manner which is particularly advantageous from the manufacturing point of view with the refining of this iron and of the pig iron in the charge to form high grade steels. Even though this is not a continuous process for the production of steel, the great significance of the process according to the invention lies in the feature that a considerable proportion of the iron required for the manufacture of the steel is derived directly from the ores. In this way the manufacture of steel becomes considerably more independent as regards raw material than it has hitherto been.

3-phase electric arc furnaces are particularly suitable for carrying out the process of the invention. Instead, however, circular furnaces may be used which, instead of having electrodes, are equipped with burners the flames of which, as is the case with electrodes, are directed downwards from the valut of the furnace on to points on the solid charge in the furnace, at which craters are melted. These craters pass through the solid charge to the liquid pig iron bath below.

In the process according to the invention, any of the usual kinds of pig iron may be used. For example pig irons which are low in phosphorus and also pig irons which contain more than 0.2% and up to 2.0% phosphorus may be used.

We claim:

1. A process for producing steel from scrap, iron oxides and molten pig iron in an electric furnace comprising, charging the furnace with non-preheated steel scrap; embedding during said charging into said scrap layers of iron oxides mixed with slag-forming agents, said layers being placed in limited regions disposed below the electrodes; charging molten pig iron onto the bottom of said furnace until the chamber of said furnace is substantially filled with said charge consisting of said non-preheated steel scrap, said layers of iron oxides and said molten pig iron; melting down the solid part of said charge until the craters originating in said solid part below the electrodes have disappeared, whereby the iron oxides of said layers while passing through said craters down to the level of said molten pig iron are reduced and the whole charge is brought into the liquid state; the heating of the molten charge then being continued and the charge being converted into high-quality steel by refining.

2. A process according to claim 1, in which the layers embedded in the scrap in regions disposed below the electrodes comprise a mixture of iron oxides, slag-forming agents and reducing agents selected from the group of carbon, ferro-silicon and aluminium.

3. A process according to claim 1, in which further quantities of iron-oxides and slag-forming agents are charged into the craters originating in the solid part of the charge below the electrodes.

4. A process according to claim 2, in which further quantities of iron-oxides, slag-forming agents and reducing agents selected from the group of carbon, ferro-silicon and aluminium are charged into the craters originating in the solid part of the charge below the electrodes.

References Cited in the file of this patent

UNITED STATES PATENTS

| | | |
|---|---|---|
| 1,844,598 | Read | Feb. 9, 1932 |
| 2,382,534 | Baily | Aug. 14, 1945 |
| 2,470,010 | Williams | May 10, 1949 |
| 2,473,681 | Hansen | June 21, 1949 |